United States Patent [19]
Hsu

[11] Patent Number: 5,694,468
[45] Date of Patent: Dec. 2, 1997

[54] CRADLE FOR RADIOTELEPHONE

[76] Inventor: Huei-Chung Hsu, 3F, No. 45-1, Chung Hsing Road, Hsi Chih Chen, Taipei Hsien, Taiwan

[21] Appl. No.: 694,764

[22] Filed: Aug. 9, 1996

[51] Int. Cl.⁶ .................................................. H04M 1/00
[52] U.S. Cl. ........................ 379/446; 379/455; 379/454; 379/426
[58] Field of Search ........................ 379/446, 426, 379/454, 455, 449; 455/89, 90, 128; 248/316.4, 231.4; 24/524, 523, 527

[56] References Cited

U.S. PATENT DOCUMENTS

| 5,305,381 | 4/1994 | Wang et al. | 379/455 |
| 5,555,302 | 9/1996 | Wang | 379/446 |

*Primary Examiner*—Jack Chiang
*Attorney, Agent, or Firm*—Morton J. Rosenberg; David I. Klein

[57] ABSTRACT

Disclosed is a cradle for radiotelephone having a hanging hole for the cradle to be conveniently hooked in a car for a radiotelephone to stably position on the running car. The cradle includes a main body to which two side arms are laterally movably attached. The two side arms can be brought to move away from each other by depressing a control button on the main body, and can be pressed toward each other with only one hand to have a desired width between them without automatically becoming away from one another again, so that the cradle can be used to accommodate radiotelephone of any size or type. A forward projected base at the bottom of the main body bears the weight of the radiotelephone to avoid the same from slipping off the cradle due to any vibration or gravity.

1 Claim, 8 Drawing Sheets

CRADLE FOR RADIOTELEPHONE

BACKGROUND OF THE INVENTION

The present invention relates to a radiotelephone cradle, and more particularly to a cradle suitable for supporting all types of radiotelephones. The cradle of the invention includes two side arms which are freely adjustable in their position relative to each other and are cushioned with foam rubber material at their inner sides to firmly hold the radiotelephone therebetween. Two lower forward projected stands are provided to the cradle to support the radiotelephone thereon so that the latter will not slip off the cradle due to any vibration or gravity.

Following the increasing growth of our living standards in recent years, there are more and more consumers using the radiotelephone or the so-called mobile phone which already becomes a latest fashion. Although it is very convenient to use a radiotelephone, there are still some problems with the use thereof.

A very common problem with the use of the radiotelephone is that it is usually freely positioned in a car when the user is driving. The radiotelephone always vibrates with the moving car, and, it is impossible for the driver to answer the phone without dangerously shifting his or her sight away from the road. This forms a serious problem.

To solve such problems, there was developed a cradle with springs and many other members. The cradle has one fixed side wall and one spring-loaded movable side wall. The spring-loaded movable side wall immediately tightly clamp a radiotelephone when the latter is positioned in the cradle. To use the radiotelephone, the user must use one hand to pull open the spring-loaded side wall and another hand to get the phone out of the cradle. This is, of course, very inconvenient to the user in some occasions, such as in driving a car. Moreover, the elasticity of the spring frequently has influences on the function of the cradle and might become fatigued after long term period of use.

SUMMARY OF THE INVENTION

It is therefore a primary object of the present invention to provide a cradle for radiotelephone which has two side arms adjustable in their positions relative to each other, permitting the cradle to firmly hold a radiotelephone of any size and any type at its two sides. The cradle also has bottom supports to bear the weight of the radiotelephone, lest the phone should slip off from the cradle due to vibration or gravity.

To achieve the above-mentioned and other objects, the radiotelephone cradle according to the present invention mainly includes two side arms capable of translating outward or inward relative to each other, a driving means formed from two crossed members, a base with two forward projected legs, and a back panel. The crossed driving means is positioned between two back plates of the side arms to engage with elongated slots formed on the back plates. Two traction springs separately and longitudinally extend between two ends of the crossed members at the same side thereof to normally pull the side arms outward for positioning the radiotelephone into the cradle. When one of the side arms is pushed inward, the two side arms move toward each other due to the linked crossed driving means, and thereby firmly hold the radiotelephone therebetween.

DETAILED DESCRIPTION OF THE PREFERRED EMBODIMENT

The present invention relates to a cradle for radiotelephone which is generally indicated with a reference number 10. Same numeral is assigned to the same part in different drawings.

Figure 1:
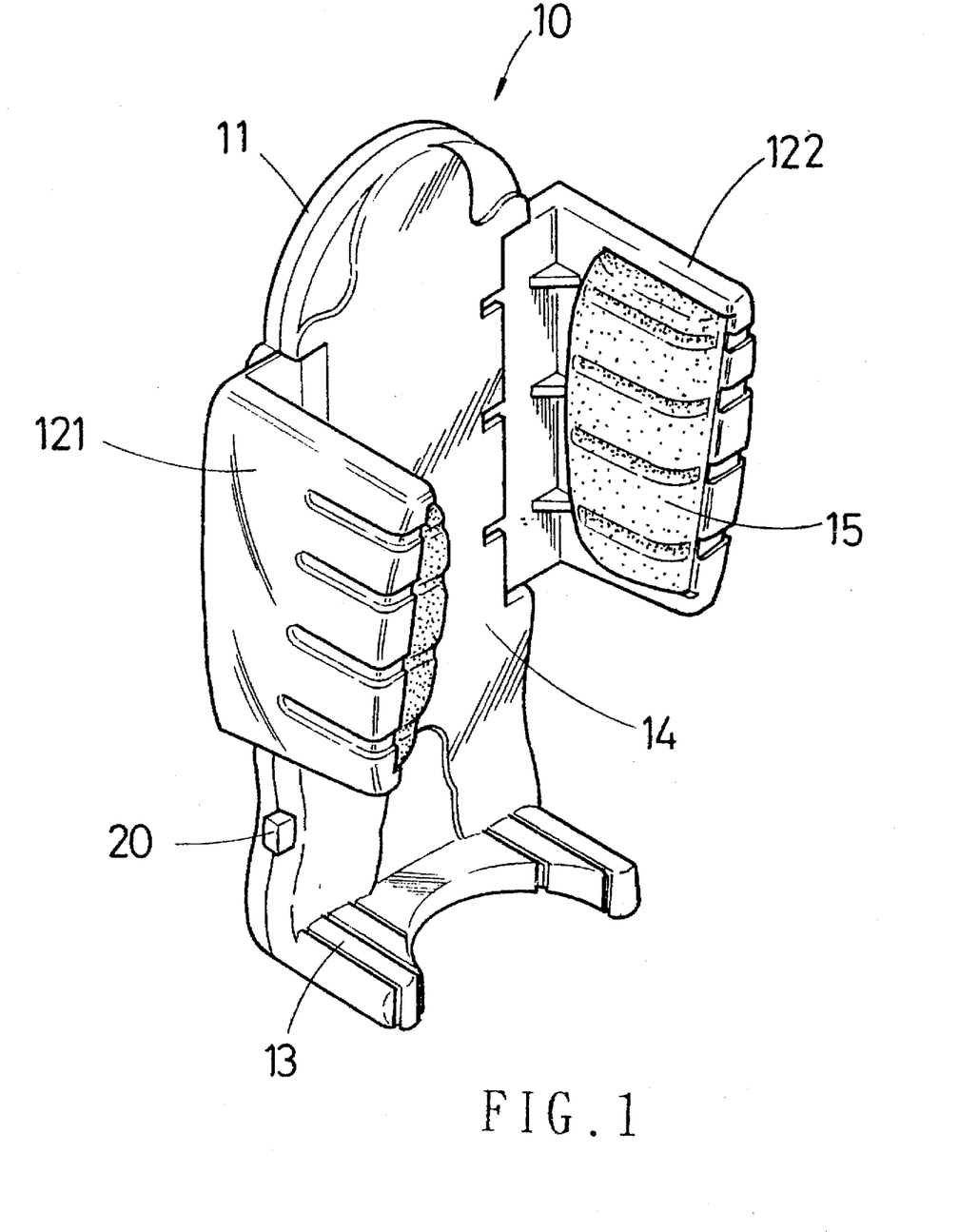
FIG. 1 is a perspective view of the radiotelephone cradle according to the present invention.
Figure 2:
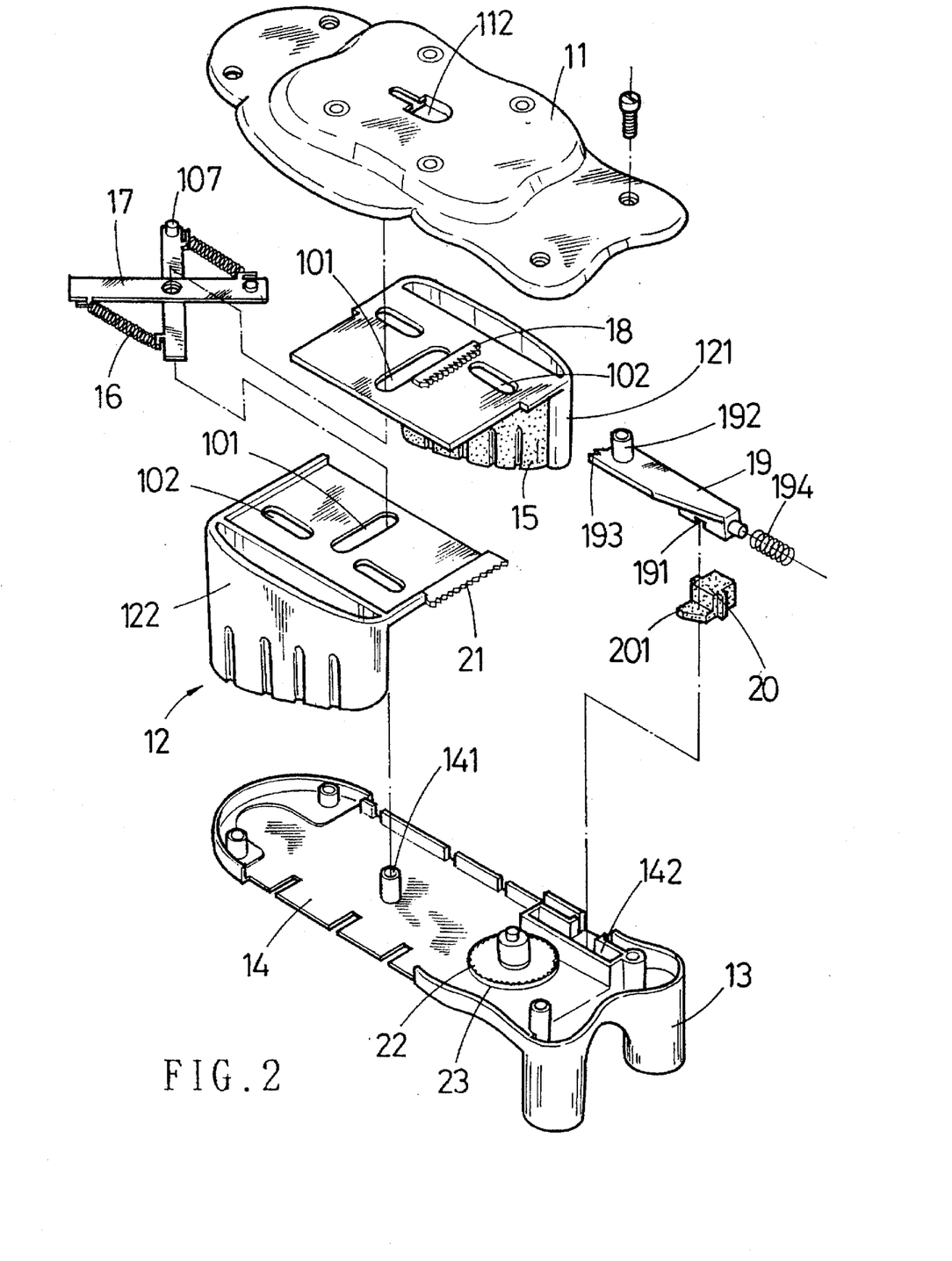
FIG. 2 is an exploded perspective view of the cradle of FIG. 1.

Please first refer to FIG. 1. The radiotelephone cradle 10 includes a main body 14 having a base 13 with two lower forward projected legs, two side arms 12 capable of moving outward or inward relative to each other, a back cover 11 attached to a rear side of the main body 14, and a control button 20 mounted to one side of the main body 14 at a proper position. FIG. 2 is an exploded perspective of the cradle 10. As shown, the cradle 10 further includes a driving means 17 and a stopper 19.

Figure 4:
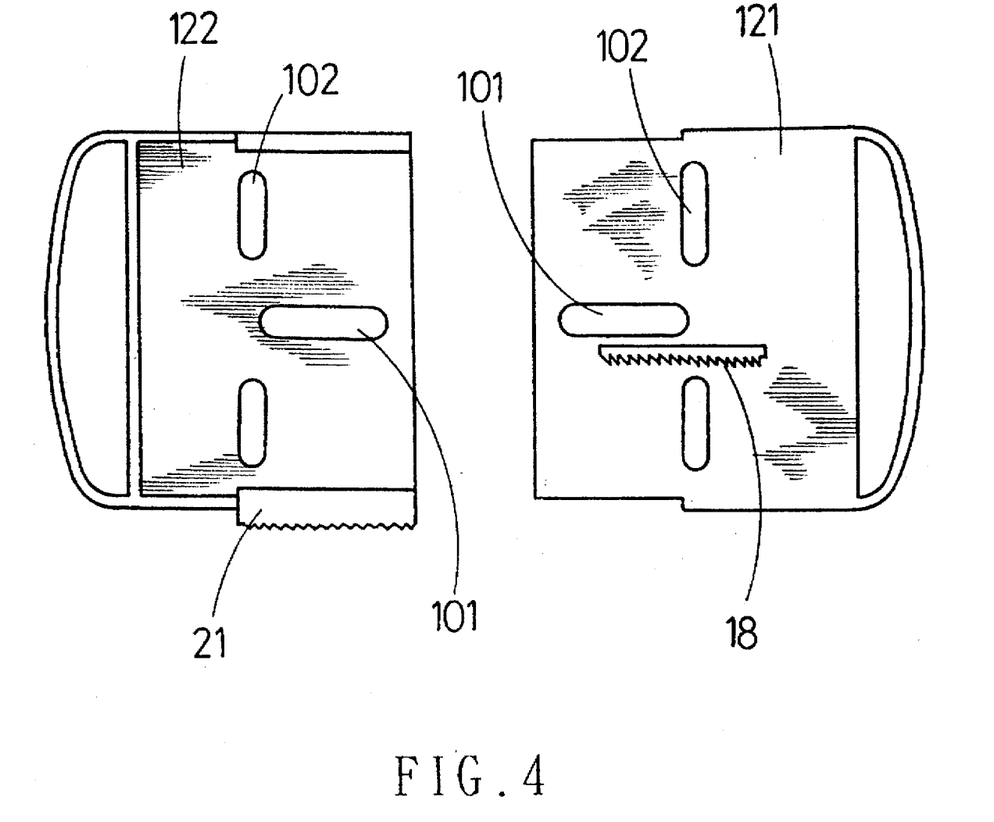
FIG. 4 is an elevational plan view from a back side of the side arms of the cradle.

As shown in FIGS. 2 and 4, the side arms 12 include a left arm 121 and a right arm 122. The left and the right arms 121, 122 are substantially symmetrically formed and each includes a back board and a holding arm forward extended from and normal to an outer edge of the back board. The holding arms are cushioned with foam rubber 15 or similar material on their inner surfaces. The back board each is formed near its middle with a transverse long slot 101 and near its outer side with two longitudinal long slots 102 symmetrically located at two sides of the slot 101. The back board of the left arm 121 is provided slightly below the longitudinal slot 101 with a transversely extended first toothed member 18. On the other hand, the back board of the right arm 122 is provided at a lower edge with a second toothed member 21.

Figure 3:
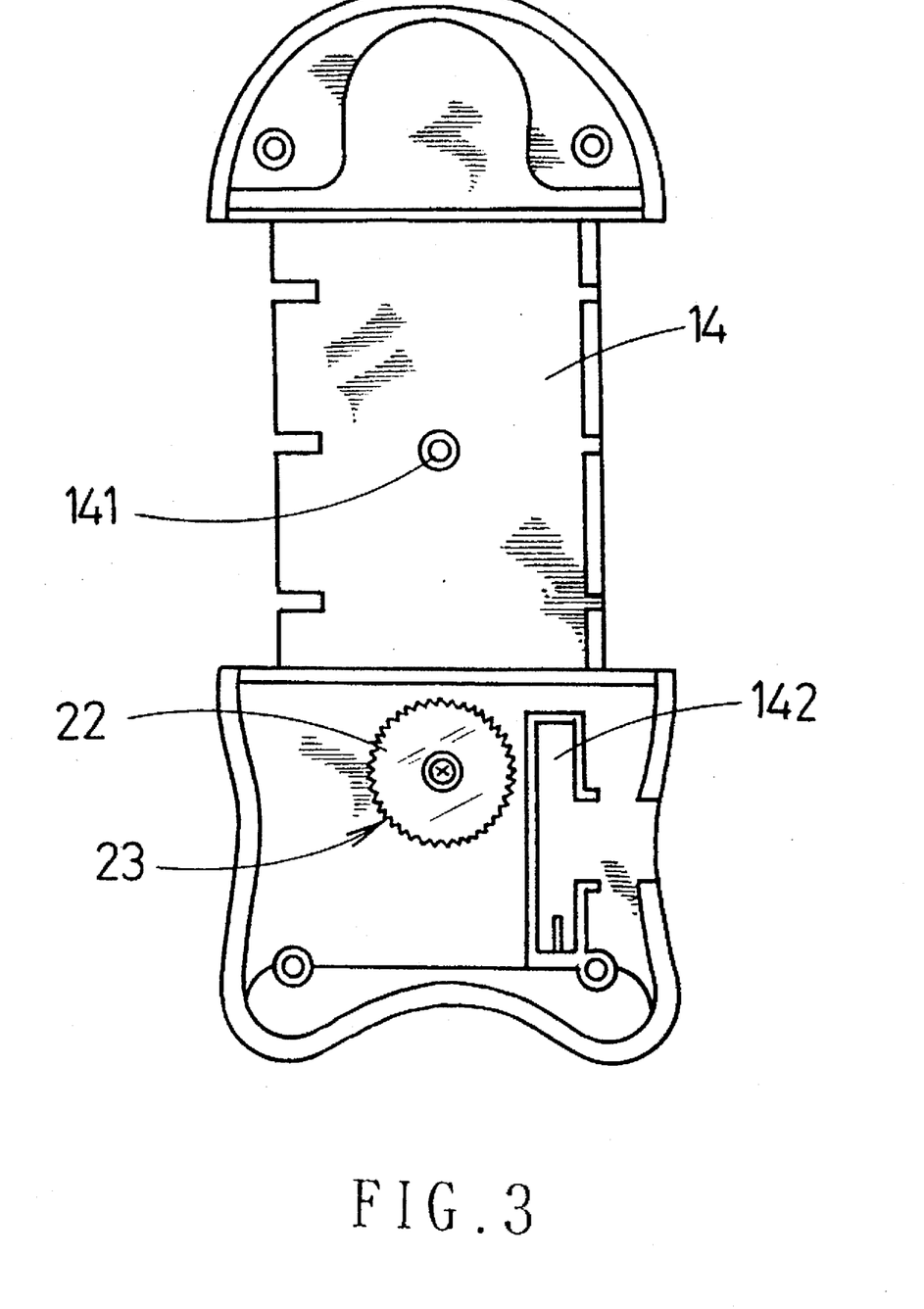
FIG. 3 is an elevational plan view of an inner side of the main body of the cradle.

As shown in FIGS. 2 and 3, the main body 14 of the cradle 10 is provided at its backside near a middle thereof with a backward projected pivot 141, at one lateral side near a lower portion with a small chamber 142 having an outer opening, and at the backside near a lower portion with a rubber pad 23 on which a rotatable braking disk 22 with toothed circumferential periphery is disposed.

As shown in FIG. 2, the driving means 17 is disposed between the two back boards of the side arms 12 and is formed from two overlapped and crossed long plates and having a through hole formed at an intersection of the crossed plates to receive the pivot 141 on the main body. The crossed plates each is provided with two round butts 107, one on a front end and another on a rear end of the plate. The butts 107 on the rear ends and on the front ends of the crossed plates are separately located to the same longitudinal side corresponding to the left longitudinal slots 102 and the right longitudinal slots 102, respectively. Two traction springs 16 are separately hooked to and longitudinally extend between two ends of the crossed plates.

Figure 6:
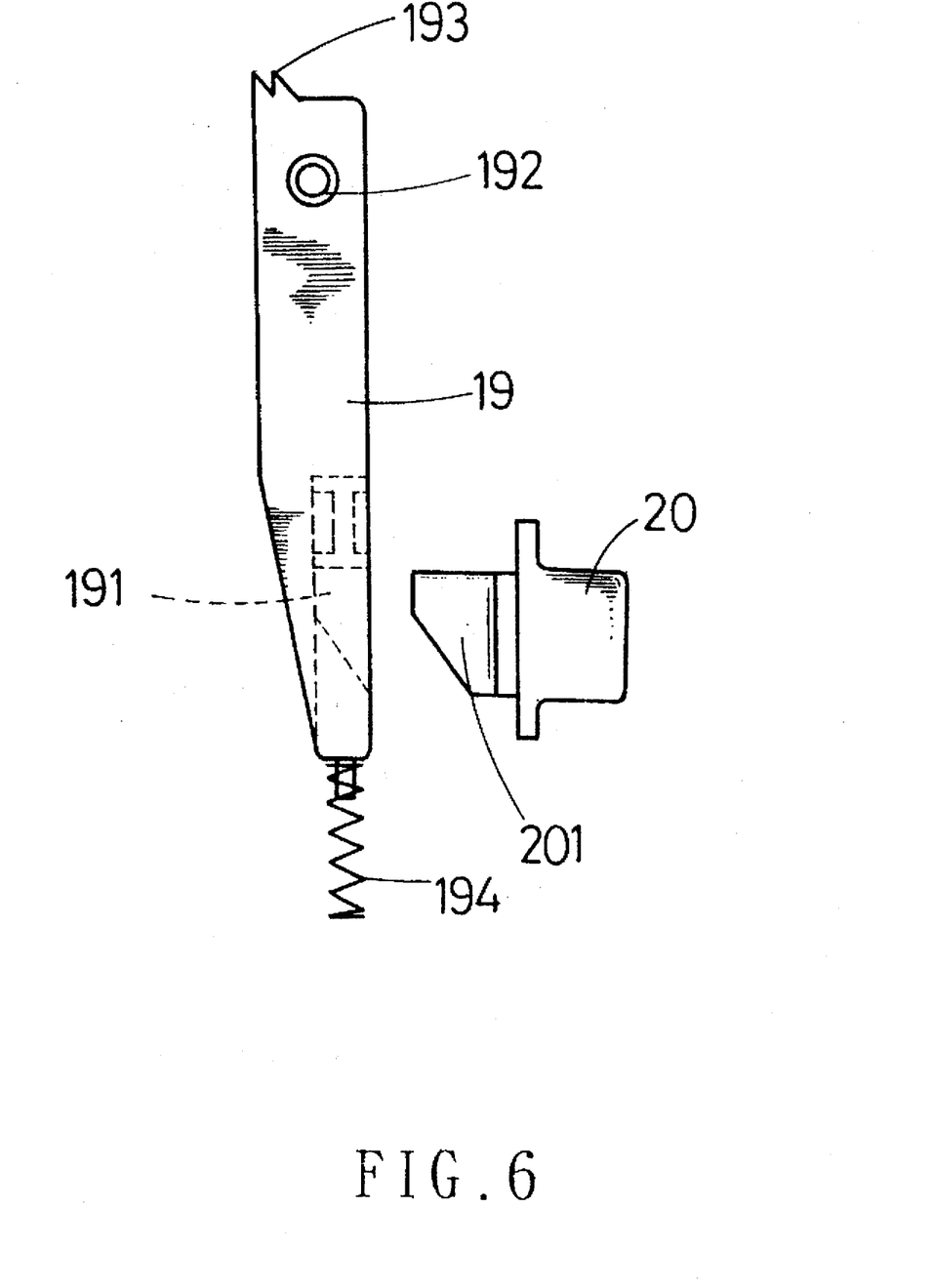
FIG. 6 illustrates the manner in which the stopper and the control button of the present invention cooperate with each other.

As shown in FIGS. 2 and 6, the stopper 19 is a slender member longitudinally positioned in the small chamber 142 provided on the main body 14. The stopper 19 includes a receiving compartment 191 formed at a lower front surface, cylindrical rod 192 formed at an upper rear surface, a toothed top edge 193, and a spring 194 disposed to a bottom end thereof, so that the spring 194 and the receiving compartment 191 are located in the small chamber 142.

Figure 7:
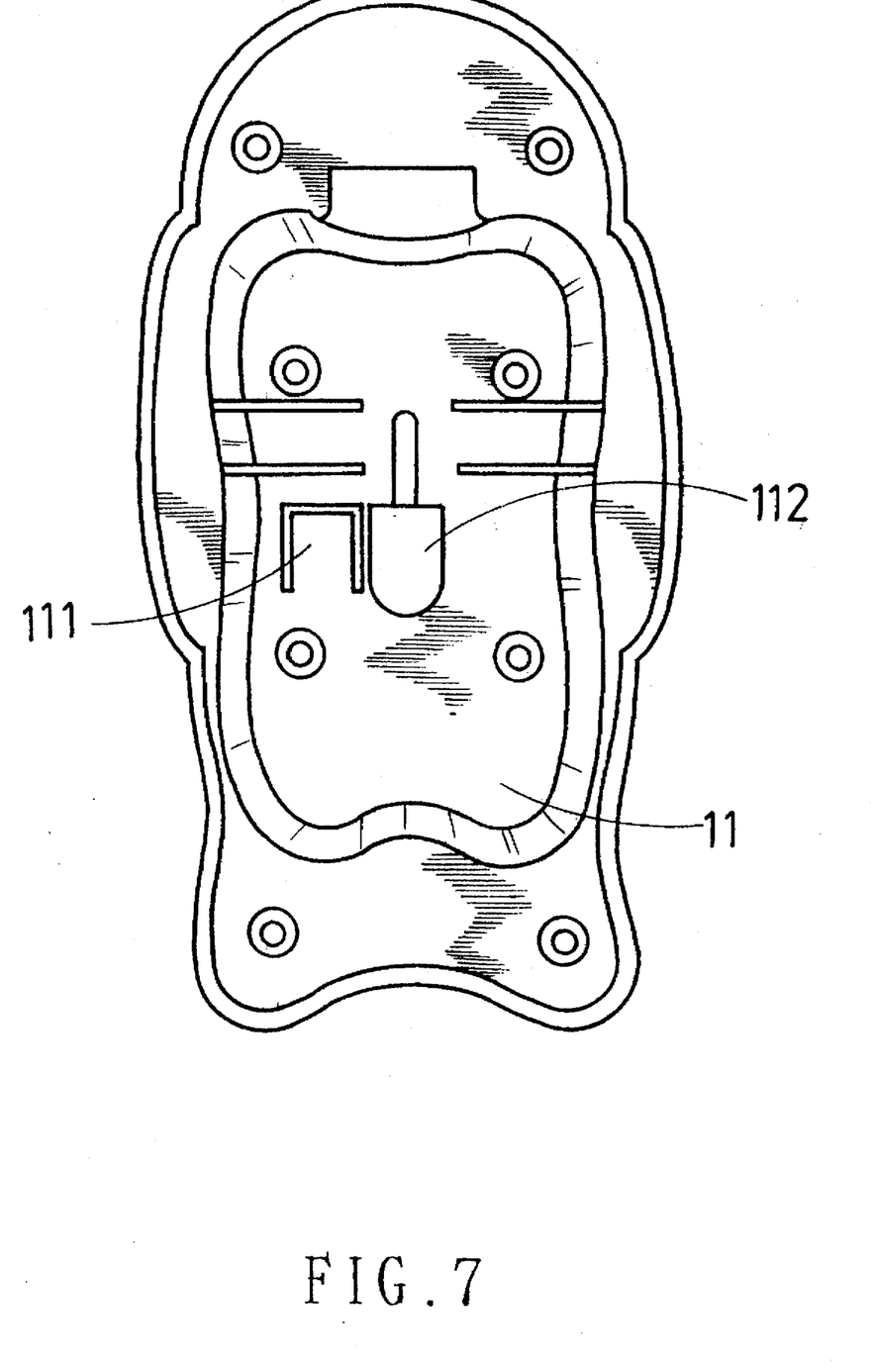
FIG. 7 is an elevational plan view from an inner side of the back cover of the present invention.

As shown in FIGS. 2 and 7, the back cover 11 has a profile approximate to that of the main body 14. The back cover 11 is formed in an inner or a front surface at a middle portion thereof with a through hole 112 for hanging the whole cradle 10 on some suitable place, and at a point to the next of the through hole 112 with a receiving space 111 for receiving the cylindrical rod 192 of the stopper 19 and defining a travel for the stopper 19.

Figure 5:
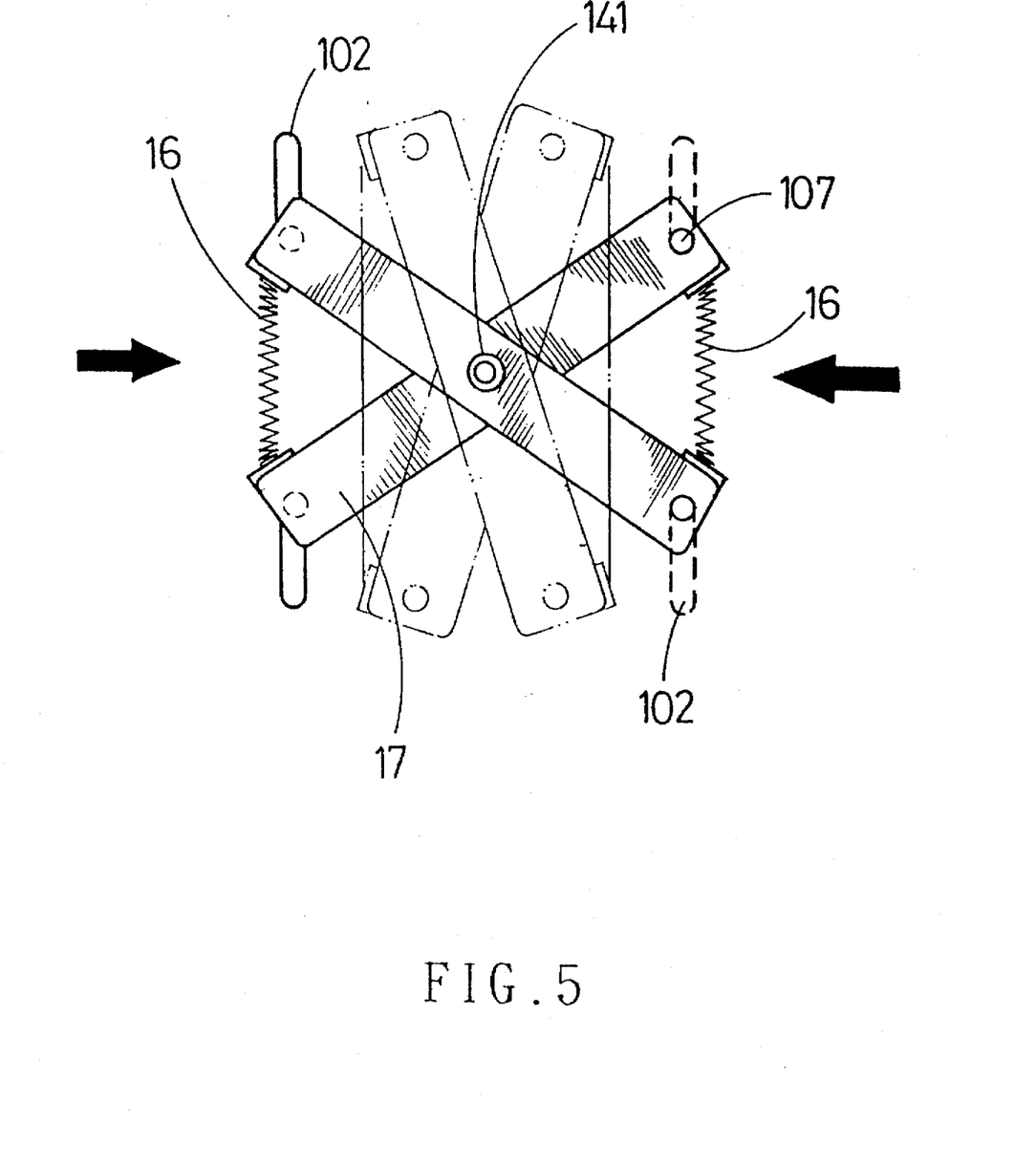
FIG. 5 illustrates the manner in which the driving means of the present invention operates to move the side arms outward or inward relative to each other.
Figure 8:
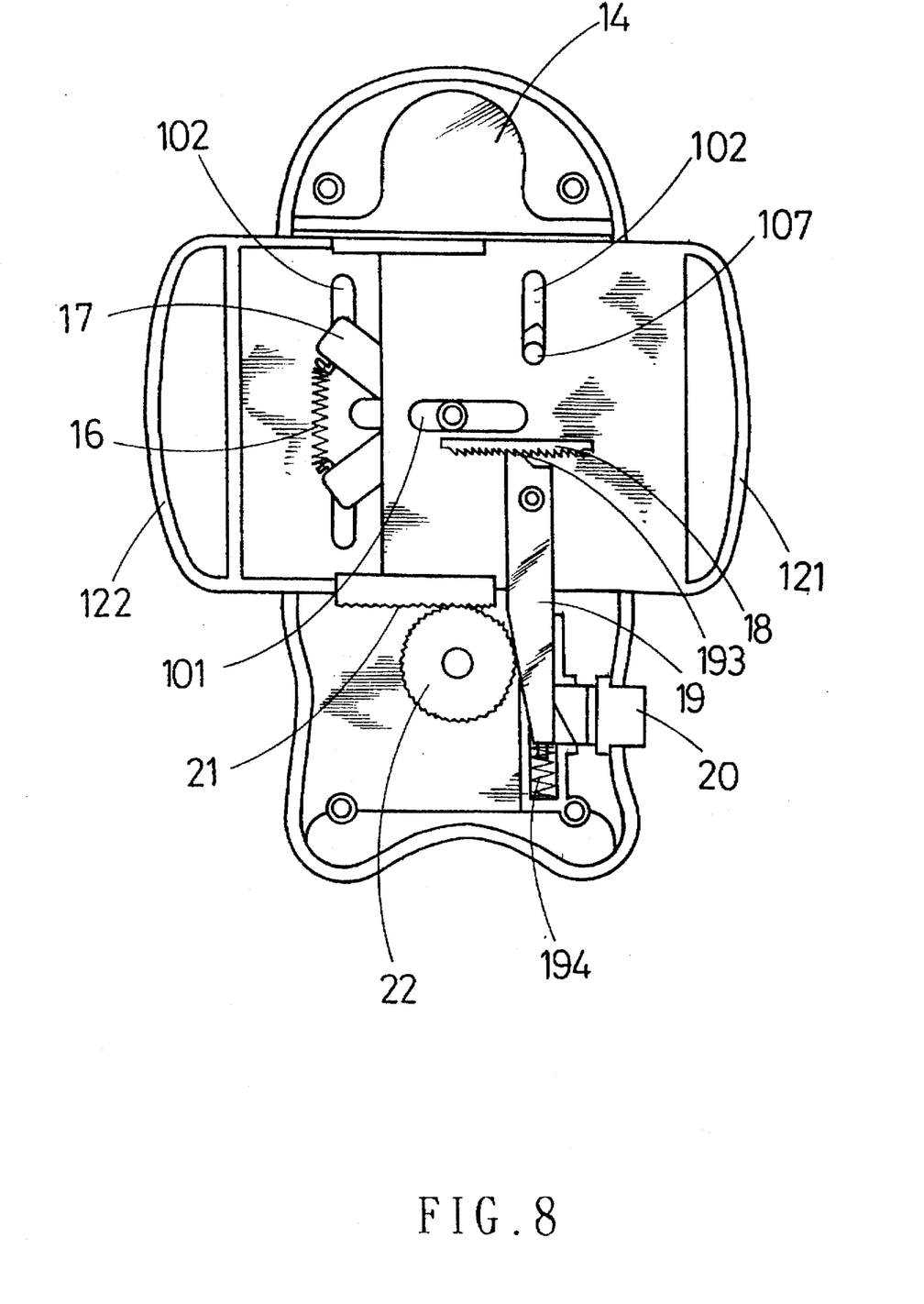
FIG. 8 illustrates the manner in which the present invention is assembled and operated.

Please now refer to FIGS. 5 and 8 at the same time. The driving means 17 is disposed between the two back boards of the side arms 12 with the rear round butts 107 separately upward extending into the longitudinal slots 102 of the left arm 121 and the front round butts 107 separately downward extending into the longitudinal slots 102 of the right arm 122. The two crossed plates forming the driving means 17 are normally pulled by the traction springs 16, causing the round butts 107 at each longitudinal side of the pivot 141 to slide in and along the slots 102 to a position close to each other and therefore push the left and the right arm 121, 122 away from each other.

As shown in FIG. 6, the control button 20 has a downward and backward inclined front end 201 which shall contact with the receiving compartment 191 of the stopper 19 when the control button 20 is depressed. Since the receiving compartment has a downward and outward inclined lower inner surface corresponding to the front end 201 of the control button 20, a further movement of the front end 201 of the control button 20 into the receiving compartment 191 shall cause the stopper to move downward. Please now refer back to FIG. 8. The toothed top edge 193 of the stopper 19 is normally engaged with the first toothed member 18 below the transverse slot 101 on the back board of the left arm 121, so that the left arm 121 is fixedly located at a predetermined position relative to the right arm 122 to meet the dimensions of a radiotelephone to be held therebetween. At this point, the traction springs 16 are stretched to some extent. The first toothed member 18 is so designed that the engagement of it with the toothed top edge 193 of the stopper 19 permits the left arm 121 to slidably move only in one direction from an outer side toward an inner side. When the stopper 19 is pushed by the control button 20 to move downward, its toothed top edge 193 is brought to disengage from the first toothed member 18. The disengagement of the stopper 19 from the first toothed member 18 releases the left arm 121 and allows the traction springs 16 to recover to their contracted state and thereby push the two side arms away from each other, allowing a radiotelephone to be held therebetween or be removed therefrom.

The control button 20 is released at the same time the user puts the phone into or removes the phone from the cradle 10 with the same hand. And, the stopper 19 is immediately pushed upward by the spring 194 disposed at a bottom end thereof to engage its toothed top edge 193 with the first toothed member 18 again. At this point, the user may use the same hand to press the left side arm 121 against the right arm until a desired width between the sides arms 121 and 122 is reached. This will cause the traction springs 16 to be gradually stretched again without automatically becoming contracted again.

The second toothed member 21 mounted to the lower edge of the right arm 122 meshes with the toothed braking disk 22 on the main body 14. This arrangement will prevent the right arm 122 from moving away from the left arm 121 at a too quick speed when the control button 20 is depressed to disengage the stopper 19 from the first toothed member 18 and allow the traction springs 16 to contract. The rubber pad 23 is tightly and frictionally attached to a bottom surface of the braking disk 22 and therefore prevents the braking disk 22 from rotating too quick.

With the two side arms freely adjustable in their positions relative to each other, the foam-rubber-material-cushioned inner surface of the side arms, and the forward projected base 13 of the main body 14, the radiotelephone cradle of the present invention may safely hold and support a radiotelephone of any dimension without the risk of a fallen radiotelephone therefrom due to any vibration or gravity.

Although the present invention has been described with a preferred embodiment thereof, it should be noted that the present invention is not limited to such embodiment and that various changes can be made without departing from the spirit of the present invention or the scope of the subjoined claims.

What is claimed is:

1. A cradle for radiotelephone, comprising a main body having a base with two lower forward projected legs, two side arms capable of moving outward or inward relative to each other, a back cover attached to a rear side of the main body, a control button mounted to one side of the main body at a proper position, a driving means, and a stopper;

said main body being provided at its backside near a middle thereof with a backward projected pivot, at one lateral side near a lower portion with a small chamber having an outer opening, and at the backside near a lower portion with a rubber pad to and on which a rotatable braking disk with toothed circumferential periphery is frictionally attached so that said braking disk is prevented from rotating too quick;

said side arms including a left arm and a right arm which are substantially symmetrically formed and each includes a back board and a holding arm forward extended from and normal to an outer edge of said back board, said holding arms being cushioned with foam rubber at their inner surfaces, said back board each being formed near its middle with a transverse long slot and near its outer side with two longitudinal long slots symmetrically located at two sides of said transverse slot, said back board of said left arm being provided slightly below said transverse slot with a transversely extended first toothed member, said back board of said right arm being provided at a lower edge with a second toothed member which meshes with said toothed braking disk on said main body and therefore prevents said right arm from moving away from said left arm at a too quick speed;

said control button having a downward and backward inclined front end laterally projecting into said outer opening of said small chamber of said main body and becoming in contact with said receiving compartment of said stopper when said control button is depressed;

said driving means being disposed between said two back boards of said two side arms and being formed from two overlapped and crossed long plates and having a through hole formed at an intersection of said crossed plates for said pivot of said main body to backward project therethrough, said crossed plates each being provided with two round butts, one on a front end and another on a rear end of said plate, such that the butts on the front ends and on the rear ends of said crossed plates are separately located to the same longitudinal side corresponding to said longitudinal slots on each of said back boards of said side arms, two traction springs being separately hooked to and longitudinally extend between two ends of said crossed plates; said front round butts separately forward extending into said longitudinal slots of said right arm and said rear round butts separately backward extending into said longitudinal slots of said left arm, said two crossed plates forming said driving means being normally pulled by said traction springs, causing said round butts at each longitudinal side of said pivot of said main body to slide in and along said longitudinal slots to a position close to each other and therefore push said left and said right arm away from each other;

said stopper being a slender member longitudinally positioned in said small chamber provided on said main body and including a receiving compartment formed at a lower front surface, a cylindrical rod formed at an upper rear surface, a toothed top edge, and a spring disposed to a bottom end thereof to be located in said small chamber along with said receiving compartment; said spring always pushing said stopper upward for said toothed top edge to engage with said first toothed member of said back board of said left arm and thereby retain said left arm at a certain predetermined position relative to said right arm with said traction springs being stretched to some extent and said control button locating at an undepressed position, and said first toothed member being so designed that the engagement of said first toothed member with said toothed top edge of said stopper permits said left arm to slidably move only in one direction from an outer side toward an inner side of said main body; said receiving compartment having a downward and outward inclined lower inner surface corresponding to said inclined front end of said control button, such that a further movement of said inclined front end of said control button into said small chamber to contact with said receiving compartment shall cause said stopper to move downward against said spring;

said back cover having a profile approximate to that of said main body, said back cover being formed in an inner or a front surface at a middle portion thereof with a through hole for hanging said cradle on some suitable place, and at a point to the next of said through hole with a receiving space for receiving said cylindrical rod of said stopper therein to define a path for said cylindrical rod;

whereby when said control button is depressed, said stopper is pushed by said inclined front end of said control button to move downward, causing its toothed top edge to disengage from said first toothed member on said left arm to free said left arm and allow said traction springs to recover to a contracted state and thereby push said two side arms away from each other, and when said control button is released, said stopper is immediately pushed upward by said spring disposed at the bottom end thereof to engage said toothed top edge with said first toothed member again; and due to a one-way slidable engagement relation between said first toothed member and said toothed top edge of said stopper, said left side arm being able to be laterally pressed against said right side arm until a desired width between said sides arms is reached while said traction springs are gradually stretched again without automatically becoming contracted again.

* * * * *